United States Patent
Wienke et al.

(10) Patent No.: US 9,522,518 B2
(45) Date of Patent: Dec. 20, 2016

(54) METHOD FOR THE MANUFACTURING OF A LOW SHRINKAGE FLEXIBLE SHEET

(75) Inventors: Dietrich Wienke, Elsloo (NL); Roelof Marissen, Born (NL); Martinus Johannes Nicolaas Jacobs, Heerlen (NL); Leonardus Jacobus Johannes Wilhelmus Welzen, Urmond (NL)

(73) Assignee: DSM IP ASSETS B.V., Heerlen (NL)

( * ) Notice: Subject to any disclaimer, the term of this patent is extended or adjusted under 35 U.S.C. 154(b) by 786 days.

(21) Appl. No.: 13/501,305

(22) PCT Filed: Oct. 12, 2010

(86) PCT No.: PCT/EP2010/065291
§ 371 (c)(1),
(2), (4) Date: Jul. 27, 2012

(87) PCT Pub. No.: WO2011/045325
PCT Pub. Date: Apr. 21, 2011

(65) Prior Publication Data
US 2012/0282406 A1     Nov. 8, 2012

(30) Foreign Application Priority Data
Oct. 12, 2009    (EP) .................................... 09172806

(51) Int. Cl.
| B32B 27/12 | (2006.01) |
| B32B 5/02 | (2006.01) |
| B32B 27/20 | (2006.01) |
| B32B 27/32 | (2006.01) |
| D06N 3/00 | (2006.01) |
| D06N 3/04 | (2006.01) |

(52) U.S. Cl.
CPC ............... *B32B 27/12* (2013.01); *B32B 5/024* (2013.01); *B32B 27/20* (2013.01); *B32B 27/32* (2013.01); *B32B 27/327* (2013.01); *D06N 3/0002* (2013.01); *D06N 3/045* (2013.01); *B32B 2262/0215* (2013.01); *B32B 2262/0253* (2013.01); *Y10T 442/3065* (2015.04); *Y10T 442/3179* (2015.04); *Y10T 442/3187* (2015.04); *Y10T 442/3886* (2015.04)

(58) Field of Classification Search
None
See application file for complete search history.

(56) References Cited

U.S. PATENT DOCUMENTS

| 3,551,231 | A | * | 12/1970 | Smedberg ............ D06N 7/0078 |
| | | | | 156/435 |
| 5,759,462 | A | * | 6/1998 | Jordan .......................... 264/105 |
| 5,773,373 | A | | 6/1998 | Wynne et al. |
| 5,994,242 | A | | 11/1999 | Arthurs et al. |
| 6,054,178 | A | | 4/2000 | Howells et al. |
| 6,280,546 | B1 | | 8/2001 | Holland et al. |
| 7,132,376 | B2 | | 11/2006 | Rashed |
| 2003/0211280 | A1 | * | 11/2003 | Brumbelow et al. ........... 428/97 |
| 2004/0058152 | A1 | * | 3/2004 | Tokarsky ................. D01D 4/00 |
| | | | | 428/373 |
| 2004/0166752 | A1 | | 8/2004 | Taghavi |
| 2005/0170724 | A1 | | 8/2005 | Ki |
| 2006/0134388 | A1 | * | 6/2006 | Miller et al. ................... 428/174 |
| 2008/0274307 | A1 | * | 11/2008 | Chereau et al. ................ 428/17 |
| 2012/0264343 | A1 | | 10/2012 | Wienke et al. |

FOREIGN PATENT DOCUMENTS

| CN | 101100889 | 1/2008 |
| JP | 11-138715 | 5/1999 |
| JP | 11-291419 | 10/1999 |
| JP | 2000-233477 | 8/2000 |
| JP | 2001-303426 | 10/2001 |
| WO | WO 2006/109319 | 10/2006 |

OTHER PUBLICATIONS

International Search Report for PCT/EP2010/065291, mailed Feb. 8, 2011.
U.S. Appl. No. 13/394,826, filed Jun. 30, 2012.

* cited by examiner

*Primary Examiner* — Shamim Ahmed
*Assistant Examiner* — Bradford Gates
(74) *Attorney, Agent, or Firm* — Nixon & Vanderhye P.C.

(57) ABSTRACT

The invention relates to a method for the manufacturing of a low shrinkage flexible sheet, said sheet comprising a fabric containing polyolefin fibers, said method comprising the steps of: a) depositing a molten plastomer layer on at least one surface of the woven fabric to form a sheet having a thickness approximately equal with the sum of the thicknesses of said molten plastomer layer and of said fabric; and b) impregnating said fabric with at least part of the molten plastomer layer by drawing the sheet into a gap between two calendaring rollers at a temperature of between the melting temperature of the plastomer and the melting temperature as determined by DSC of the polyolefin fibers, said gap having a width smaller than the thickness of the sheet; wherein the width of the gap is chosen to apply an impregnation pressure on the sheet of at least 20 bars.

41 Claims, No Drawings

METHOD FOR THE MANUFACTURING OF A LOW SHRINKAGE FLEXIBLE SHEET

This application is the U.S. national phase of International Application No. PCT/EP2010/065291, filed 12 Oct. 2010, which designated the U.S. and claims priority to EP Application No. 09172806.3, filed 12 Oct. 2009, the entire contents of each of which are hereby incorporated by reference.

The invention relates to a method for the manufacturing of a low shrinkage flexible sheet suitable for use in a variety of applications such as covers for cargo and containers, ground covers, roofing, curtains, tarpaulins and building covers and to a manufacturing method of said sheet.

Numerous methods for the manufacturing of low shrinkage flexible sheet are described in literature and known in practice. The sheets manufactured thereof usually include a fabric for reinforcement, said fabric being encapsulated between sheets of thermoplastic material adhered thereto. Woven or non-woven fabrics made of high-strength and low shrinkage fibers, e.g. fibers of polyester, nylon, aramid or glass were used for reinforcement, while a plethora of polymers was utilized for the sheets of thermoplastic material. Among the most used polymers are elastomers such as thermoplastic polyolefins, ethylene-propylene rubber (EPM), ethylene-propylene-diene rubber (EPDM); thermoplastic urethanes and polyvinyl chloride polymers. Examples of embodiments of known flexible sheets and methods for the manufacturing thereof are disclosed for instance in U.S. Pat. No. 5,773,373; U.S. Pat. No. 5,994,242, U.S. Pat. No. 6,864,195, U.S. Pat. No. 6,054,178, JP 11 138715, JP 11 291419 and JP 2000 233477.

It was however observed that the known methods are ineffective in manufacturing low shrinkage flexible sheets comprising polyethylene fabrics, i.e. fabrics made of yarns containing polyethylene fibers.

It was furthermore noticed by the present inventors that the manufacturers of flexible sheets systematically avoided the utilization of polyethylene fabrics for reinforcement. The reason thereof is that all attempts failed when trying to construct a dimensionally stable flexible sheet including such a polyethylene fabric. It is long known that polyethylene fibers have a low compressive yield strength and that such fibers may be affected during utilization by the formation of so-called kink bands. Without being bound to any explanation, the inventors attributed the formation of the kink-bands to the shrinkage of the fibers and hence to the shrinkage of the products containing thereof. Therefore, the advantageous properties of polyethylene fibers, e.g. lightweight, chemical resistance and high strength, could not be utilized to their full extent for this type of technology.

In spite of the above drawbacks, there were a few attempts to use a polyethylene fabric for reinforcement, e.g. in U.S. Pat. No. 6,280,546, wherein a flexible sheet was manufactured by laminating said fabric with a low density polyethylene (LDPE) layer or an ethylene vinyl acetate (EVA) layer. However it was observed that such flexible sheets still presented an increased shrinkage during utilization and were therefore unsuitable for long term applications.

It is therefore an aim of the present invention to provide a method for the manufacturing of a low shrinkage flexible sheet, said sheet comprising a fabric containing polyolefin fibers.

The method of the invention comprises the steps of:
(a) depositing a molten plastomer layer on at least one surface of the woven fabric to form a sheet having a thickness approximately equal with the sum of the thicknesses of said molten plastomer layer and of said fabric; and
(b) impregnating said fabric with at least part of the molten plastomer layer by drawing the sheet into a gap between two calendaring rollers at a temperature of between the melting temperature of the plastomer and the melting temperature as determined by DSC of the polyolefin fibers, said gap having a width smaller than the thickness of the sheet;
wherein the width of the gap is chosen to apply an impregnation pressure on the sheet of at least 20 bars.

At step (a) the plastomer is molten at a temperature above its melting temperature and preferably of at most 180° C., more preferably of at most 165° C. Preferably, the plastomer is molten at a temperature of at least 90° C., more preferably of at least 95° C.

Preferably at step (b) the width of the gap is chosen to apply an impregnation pressure on the sheet of at least 30 bars, more preferably at least 40 bars, most preferable at least 50 bars.

Preferably, the polyolefin fibers contained by the woven fabric are polyethylene fibers, more preferably high molecular weight polyethylene fibers, most preferably ultrahigh molecular weight polyethylene (UHMWPE) fibers.

Preferably at step (b), the temperature is between 80° C. and 160° C., more preferably between 90° C. and 150° C.; and when a woven fabric comprising yarns containing UHMWPE fibers is used, the temperature is preferably between 90° C. and 145° C., more preferably between 100° C. and 130° C.

The steps of the method according to the invention may be repeated in order to deposit a plastomer layer on both surfaces of the woven fabric such that a woven fabric encapsulated in the plastomer is obtained.

Preferably, the woven fabric is preheated before depositing the plastomer thereon. It was observed that for such preheated fabric, the homogeneity of the flexible sheet is increased. Preferably, the woven fabric is preheated to a temperature of between 50° C. and 130° C., more preferably to a temperature of between 80° C. and 100° C. The preheating of the woven fabric can be carried out by using infrared radiation (IR) or a stream of hot air. In a preferred embodiment, the preheating is carried out by contacting the woven fabric with a heated roller. It was observed that such contact method is more efficient for preheating said fabric than IR or hot air.

Melting the plastomer can be carried out according to known methods in the art, for example in an extruder. Preferably, the plastomer is molten at a temperature of between 120° C. and 150° C., more preferably of between 130° C. and 145° C. It was observed that when using such temperatures for melting the plastomer, a better impregnation of the woven fabric was obtained and the obtained flexible sheet showed a reduced shrinkage. It was also observed that less voids and/or air pockets occur in the flexible sheet.

After the impregnation step, the flexible sheet is cooled in a cooling step, e.g. with a stream of cold air or by contacting said sheet with a cooled roller, to a temperature below 50° C., more preferably to a temperature of between 10° C. and 30° C.

In a preferred embodiment, the method of manufacturing the low shrinkage flexible sheet comprises subsequent to the impregnation step a further compression step (c). Preferably the further compression step is subsequent to the cooling step. During said further compression step the flexible sheet is heated to a heating temperature of preferably between the melting temperature of the plastomer and the melting temperature as determined by DSC of the polyethylene fibers, more preferably between 60 and 150° C. For fabrics comprising yarns containing UHMWPE fibers, the heating temperature is preferably between 70° C. and 145° C., more preferably between 90° C. and 140° C., most preferably between 110° C. and 120° C. Preferably the sheet is compressed by applying a compression pressure in a direction perpendicular to a plane defined by the lateral dimensions of the sheet, e.g. the plane containing the dimensions of width and thickness of the sheet in case of a rectangular sheet or the plane containing the circumference of the sheet in case of a round sheet. The compression pressure is preferably at least 30 bars, more preferably at least 40 bars, most preferably at least 45 bars. Preferably the compression pressure is applied by drawing the flexible sheet in a gap between two calendaring rollers. The compression pressure can be set routinely by adjusting the width of said gap between said calendaring rollers such that said width is less than the thickness of the flexible sheet before is drawn into the gap. Preferably the thickness after the compression step is reduced with at least 2%, more preferably at least 4%, most preferably at least 6%. It was observed that the further compression step produces flexible sheets having an even further reduced shrinkage and being less prone to delamination. It was also observed that the difference between the shrinkage in the warp direction and that in the weft direction of the woven fabric used in the flexible sheet is further decreased and hence a more homogeneous sheet was obtained.

The plastomer used according to the invention is a plastic material that belongs to the class of thermoplastic materials. Preferably, said plastomer is a semi-crystalline copolymer of ethylene or propylene and one or more C2 to C12 α-olefin co-monomers, said plastomer having a density of between 880 and 930 kg/m$^3$. It was observed that a flexible sheet manufactured with a process wherein such a plastomer is used showed a good shrinkage resistance, in particular when the plastomer was manufactured by a single site catalyst polymerization process. Preferably said plastomer is a metallocene plastomer, i.e. a plastomer manufactured by a metallocene single site catalyst. Ethylene is in particular the preferred co-monomer in copolymers of propylene while butene, hexene and octene are being among the preferred α-olefin co-monomers for both ethylene and propylene copolymers.

In a preferred embodiment, the plastomer is a thermoplastic copolymer of ethylene or propylene and containing as co-monomers one or more α-olefins having 2-12 C-atoms, in particular ethylene, isobutene, 1-butene, 1-hexene, 4-methyl-1-pentene and 1-octene. When ethylene with one or more C3-C12 α-olefin monomers as co-monomers is applied, the amount of co-monomer in the copolymer usually is lying between 1 en 50 wt. %, and preferably between 5 and 35 wt. %. In case of ethylene copolymers, the preferred co-monomer is 1-octene, said co-monomer being in an amount of between 5 wt % and 25 wt %, more preferably between 15 wt % and 20 wt %. In case of propylene copolymers, the amount of co-monomers and in particular of ethylene co-monomers, usually is lying between 1 en 50 wt. %, and preferably between 2 and 35 wt %, more preferably between 5 and 20 wt. %. Good results in terms of shrinkage were obtained when the density of the plastomer is between 880 and 920 kg/m$^3$, more preferably between 880 and 910 kg/m$^3$.

Better resistance to shrinkage was obtained when the plastomer used according to the invention has a DSC peak melting point as measured according to ASTM D3418 of between 70° C. and 120° C., preferably between 75° C. and 100° C., more preferably between 80° C. and 95° C.

A plastomer manufactured by a single site catalyst polymerization process and in particular a metallocene plastomer is distinguished from ethylene and propylene copolymers that have been manufactured with other polymerization techniques, e.g. Ziegler-Natta catalysation, by its specific density. Said plastomer also differentiates itself by a narrow molecular weight distribution, Mw/Mn, the values thereof preferably being between 1.5 en 3 and by a limited amount of long chain branching. The number of long chain branches preferably amounts at most 3 per 1000 C-atoms. Suitable plastomers that may be used in the process of the invention and obtained with the metallocene catalyst type are manufactured on a commercial scale, e.g by Exxon, Mitsui, DEX-Plastomers and DOW under brand names as Exact, Tafmer, Exceed, Engage, Affinity, Vistamaxx and Versify. A description of plastomers and in particular of metallocene plastomers as well as an overview of their mechanical and physical properties can be found for instance in Chapter 7.2 of "*Handbook of polypropylene and polypropylene composites*" edited by Harutun G. Karian (ISBN 0-8247-4064-5) and more in particular in subchapters 7.2.1; 7.2.2; and 7.2.5 to 7.2.7 thereof, which are included herein by reference.

The plastomer may also contain various fillers and additives added thereof. Examples of fillers include reinforcing and non-reinforcing materials, e.g. carbon black, calcium carbonate, clay, silica, mica, talc, and glass. Examples of additives include stabilizers, e.g. UV stabilizers, pigments, antioxidants, flame retardants and the like. Preferred flame retardants include aluminum tryhidrate, magnesium dehydrate and ammonium phosphate. The amount of flame retardants is preferably from 1 to 60, more preferably from 1 to 10 by weight percent of the amount of plastomer in the flexible sheet. Most preferred flame retardant is ammonium phosphate, e.g. Exolit.

Good shrinkage resistance was obtained when the amount of plastomer was chosen to yield a flexible sheet having an areal density (AD) that is with at least 20%, more preferably at least 50% higher than the AD of the woven fabric utilized thereof. Preferably the flexible sheet has an areal density (AD) that is with at most 500%, more preferably at most 400%, most preferably at most 300% higher than the AD of the woven fabric utilized thereof. Best results were obtained when the plastomer encapsulates the woven fabric and the amount of plastomer was chosen as indicated hereinabove. AD is expressed in kg/m$^2$ and is obtained by weighing a certain area, e.g. 0.01 m$^2$ and dividing the obtained mass by the area of the sample.

By fiber is herein understood a continuous elongated body having a length dimension much greater that the fiber's transverse dimensions, e.g. of width and thickness. The term fiber also includes various embodiments e.g. a filament, a ribbon, a strip, a band, a tape and the like having regular or irregular cross-sections. A yarn for the purpose of the invention is an elongated body containing a plurality of fibers.

As mentioned hereinabove, preferred polyolefin fibers are polyethylene fibers, more preferably said polyolefin fibers are high molecular weight polyethylene (HMWPE) fibers, most preferably said polyolefin fibers are ultrahigh molecular weight polyethylene (UHMWPE) fibers. Polyolefin and in particular polyethylene fibers may be manufactured by any technique known in the art, preferably by a melt or a gel spinning process. Most preferred fibers are gel spun UHMWPE fibers, e.g. those sold by DSM Dyneema under the name Dyneema®. If a melt spinning process is used, the polyolefin and in particular the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity (IV) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7.

Other yarns of fibers that may be used in combination with the yarns containing polyolefin fibers to construct the woven fabric include but are not limited to yarns of fibers manufactured from polyamides and polyaramides, e.g. poly(p-phenylene terephthalamide) (known as Kevlar®); poly(tetrafluoroethylene) (PTFE); poly{2,6-diimidazo-[4,5b-4', 5'e]pyridinylene-1,4(2,5-dihydroxy)phenylene} (known as M5); poly(p-phenylene-2,6-benzobisoxazole) (PBO) (known as Zylon®); poly(hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyvinyl alcohols; thermotropic liquid crystal polymers (LCP) as known from e.g. U.S. Pat. No. 4,384,016; but also other classes of polyolefins than the once already used, e.g. homopolymers and copolymers of polyethylene or polypropylene. Also yarns containing combinations of fibers manufactured from the above referred polymers can be used to manufacture the woven fabric contained in the inventive flexible sheet. Preferred other yarns however are those containing fibers of polyamide and/or LCP.

Preferably, the fibers employed by the invention have deniers in the range of from 0.5 to 20, more preferably from 0.7 to 10, most preferably from 1 to 5 dpf. The yarns containing said fibers preferably have deniers in the range of from 100 to 3000, more preferably from 200 to 2500, most preferably from 400 to 1000 dtex.

The tensile strength of the polyolefin and in particular of the polyethylene fibers utilized in the present invention as measured according to ASTM D2256 is preferably at least 1.2 GPa, more preferably at least 2.5 GPa, most preferably at least 3.5 GPa. A flexible sheet utilizing a fabric manufactured from such strong fibers is lighter in weight and stronger than any other flexible sheet having the same construction which utilizes fabrics manufactured from e.g. polyester, nylon, aramid or glass fibers. The tensile modulus of the polyolefin and in particular of the polyethylene fibers as measured according to ASTM D2256 is preferably at least 30 GPa, more preferably at least 50 GPa, most preferably at least 60 GPa.

Preferred embodiments of woven fabrics suitable for use in the process of the invention include plain (tabby) weaves, basket weaves, crow feet weaves and satin weaves although more elaborate weaves such as triaxial weaves may also be used. More preferably the woven fabric is a plain weave, most preferably, the woven fabric is a basket weave. Preferably, the yarns used to manufacture the woven fabric consist of fibers having a rounded cross-section, said cross section having an aspect ratio of at most 4:1, more preferably at most 2:1.

The invention will be further explained with the help of the following examples without being however limited thereto.

METHODS OF MEASUREMENT

IV: the Intrinsic Viscosity of UHMWPE is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration.

Dtex: of a fiber was measured by weighing 100 meters of fiber. The dtex of the fiber was calculated by dividing the weight in milligrams by 10.

Total volume of voids $V_{voids}$ in %: contained by a flexible sheet is calculated according to formula:

$$V_{voids}[\%] = \frac{T_{sheet} - \frac{AD_{fabric}}{\rho_{fiber}} - \frac{AD_{coating}}{\rho_{coating}}}{T_{sheet}} \times 100$$

wherein $T_{sheet}$ is the thickness of the flexible sheet; $AD_{fabric}$ and $AD_{coating}$ are the areal densities of the flexible sheet and the coating, respectively; and $\rho_{fiber}$ and $\rho_{coating}$ are the densities of the polyethylene fiber and the coating, respectively. The density $\rho_{fiber}$ of the fiber is determined in accordance with ASTM D1505-03.

Thickness: of a woven fabric or of a flexible sheet was determined by measuring 10 times the distance between the surfaces thereof at different locations and averaging the results. Care was taken not to deform the sample during measurements.

Shrinkage: a square sample of 0.4 m length and 0.4 m width, was placed in the drum of a laundry machine and rotated in the absence of water at a rotating speed of 60 rot/min for 72 hours at a temperature of about 23° C. and humidity of about 65% together with a number of 5 clay balls. Each clay ball had a mass of 0.22 Kg and a diameter of about 50 mm, the surface of each ball being covered with a cotton fabric by placing the ball in a cotton bag which tightly accommodates the ball. The dimensions of the sample were measured before and after the treatment and the difference thereof (expressed in %) was considered representative for the shrinkage of the sample.

EXAMPLES AND COMPARATIVE EXPERIMENTS

Example 1

A basket woven fabric having an AD of 0.193 kg/m², a continuous length, a thickness of about 0.6 mm and a width of about 1.72 m, and containing 880 dtex polyethylene yarns known as Dyneema® SK 65 was rolled off continuously from a bobbin and preheated to a temperature of about 90° C. by contacting it with the heated surface of a roller rotating at a speed of 15 m/min.

The plastomer was molten in an extruder at a temperature of about 145° C. and discharged into the gap between a first and a second calendaring rollers counter rotating with a surface speed of about 15 m/min. The width of the gap was about 0.2 mm. The surface of the first calendaring roller was kept at a temperature of about 130° C. while the surface of the second roller was kept at about 137° C. The molten plastomer adhered to the surface of the second roller and was drawn through the gap, emerging on the opposite side as a layer adhered to the surface of the second roller.

The plastomer used was Exact® 0203 plastomer from DexPlastomers which is an ethylene based octane plastomer with about 18% octane, a density of 902 kg/m$^3$ and a DSC peak melting point of 95° C.

The preheated fabric was introduced into a gap of about 0.5 mm, defined between the second calendaring roller and a third roller counter rotating with said second roller, said third roller being kept at a temperature of about 20° C. The third roller was rotating with a surface speed of about 15 m/min. One surface of the fabric abutted the surface of the third roller while the other was in contact with the molten plastomer layer such that a sheet was formed containing a molten layer of plastomer adhered on the surface of the fabric. The sheet emerged on the opposite side of the gap and it was subsequently cooled at room temperature (about 20° C.).

The above process was repeated in order to coat both surfaces of the woven fabric with a plastomer layer such to encapsulate the fabric into the plastomer. During this encapsulating process, the gap between the second calendaring roller and the third roller was 0.7 mm.

The obtained sheet was flexible and had a thickness of about 0.8 mm, an AD of 0.550 kg/m$^2$ and less than 40% voids. The AD of the sheet was 280% larger than the AD of the woven fabric. The plastomer layer was devised into:

a first part of AD of about 0.175 kg/m$^2$ covering one surface;

a second part impregnated through the fabric between the yarns and fibers thereof; and a third part having an AD of about 0.175 kg/m$^2$ covering the other surface. The results are presented in Table 1.

Example 2

Example 1 was repeated with the difference that a further compression step was carried out after the last cooling step. The further compression step included a post-calendaring process which took place between two calendaring rollers at a temperature of 120° C. and a pressure of 45 bars. The thickness reduction during the further compression step was 6%.

COMPARATIVE EXPERIMENT A-C

The fabric of Example 1 was impregnated with in one experiment (A) with neoprene rubber and in another (B) with polyurethane (from Barrday Inc, Canada) by a dipcoating process. The rubber was subsequently cured.

In a third experiment (C), a polyethylene fabric was covered with EVA according to the method described in Example 2 of U.S. Pat. No. 6,280,546.

| Sample | Shrinkage in warp direction (%) | Shrinkage in weft direction (%) | Total shrinkage (%) |
|---|---|---|---|
| Example 1 | 0.96 | 0.42 | 0.69 |
| Example 2 | 0.58 | 0.50 | 0.54 |
| Comp. Exp. A | 3.10 | 1.30 | 2.20 |
| Comp. Exp. B | 5.00 | 3.95 | 4.47 |
| Comp. Exp. C | 1.60 | 2.25 | 1.92 |
| Uncoated fabric of polyethylene | 21.00 | 34.00 | 27.5 |

From the above examples and comparative experiments it can be observed that the flexible sheet manufactured with the process of the invention shows a reduced shrinkage when compared to known fabrics or fabrics made in accordance with processes disclosed in various publications.

The invention claimed is:

1. A method for the manufacturing a flexible sheet which comprises a fabric containing polyolefin fibers, wherein the method comprises the steps of:
    (a) forming a layer of molten plastomer onto at least one surface of a woven fabric by extruding molten plastomer as a layer into contact with the at least one surface of the woven fabric to form a preform sheet having a thickness approximately equal with a sum of thicknesses of the molten plastomer layer and the woven fabric; and
    (b) impregnating the fabric with at least part of the molten plastomer layer by drawing the preform sheet into a gap between two calendering rollers at a temperature of between a melting temperature of the plastomer and a melting temperature of the polyolefin fibers as determined by Differential Scanning calorimetry (DSC) to thereby form a low shrinkage flexible sheet, wherein step (b) includes adjusting the gap between the two calendering rollers to provide a gap width which is smaller than the thickness of the preform sheet prior to being drawn into the gap to thereby cause the calendering rollers to apply an impregnation pressure on the preform sheet of at least 20 bars.

2. The method of claim 1, wherein step (a) comprises applying the molten plastomer layer onto the fabric at a plastomer temperature above a melting temperature of the plastomer to a temperature of at most 180° C.

3. The method of claim 2, wherein the molten plastomer layer is deposited at a plastomer temperature between 120° C. and 150° C.

4. The method of claim 1, wherein step (b) includes adjusting the gap width so that the calendering rollers apply an impregnation pressure of at least 30 bars.

5. The method of claim 1, wherein step (b) is practiced at a calandering temperature between 80° C. and 160° C.

6. The method of claim 1, wherein step (a) comprises preheating the woven fabric before depositing the molten plastomer layer thereon.

7. The method of claim 6, wherein the woven fabric is preheated to a temperature between 50° C. and 130° C.

8. The method of claim 1, further comprising subsequent to the impregnation step (b), a further compression step (c) which comprises heating the flexible sheet to a heating temperature, and compressing the heated flexible sheet by application of a compression pressure.

9. The method of claim 8, wherein the thickness of the flexible sheet after the compression step (c) is reduced by at least 2%.

10. The method of claim 1, wherein the plastomer is a semi-crystalline copolymer of ethylene or propylene and one or more C2 to C12 α-olefin co-monomers, and wherein the plastomer has a density of between 880 and 930 kg/m³.

11. The method of claim 1, wherein the plastomer is a thermoplastic copolymer of ethylene or propylene and containing as co-monomers one or more α-olefins having 2-12 C-atoms.

12. The method of claim 1, wherein the amount of the plastomer is chosen to yield a flexible sheet having an areal density (AD) that is at least 20% higher than the AD of the woven fabric.

13. The method of claim 1, wherein the polyolefin fibers are polyethylene fibers.

14. The method of claim 1, wherein the woven fabric is selected from the group consisting of plain weaves, basket weaves, crow feet weaves, satin weaves and triaxial weaves.

15. The method of claim 1, wherein step (b) is practiced at a calendering temperature between 90° C. and 150° C.

16. The method of claim 13, wherein step (b) comprises compressing the flexible sheet while heating the flexible sheet at a heating temperature between the melting temperature of the plastomer and the melting temperature of the polyethylene fibers as determined by DSC.

17. The method of claim 8, wherein the heating temperature of the compression step (c) is between 60 and 150° C.

18. The method of claim 13, wherein the polyethylene fibers are high molecular weight polyethylene (HMWPE) fibers having a weight average molecular weight between 20,000 and 600,000 g/mol.

19. The method of claim 18, wherein the polyethylene fibers are ultrahigh molecular weight polyethylene (UHMWPE) fibers.

20. The method claim 18, wherein the HMWPE fibers have a weight average molecular weight between 60,000 and 200,000 g/mol.

21. A method for manufacturing a plastomer-coated flexible sheet comprised of a fabric formed of polyolefin fibers and a plastomer coated on a surface of the fabric, wherein the method comprises the steps of:
  (a) forming a molten layer of plastomer by extruding a plastomer melt into a first gap defined between opposed surfaces of first and second counter-rotating rollers, wherein the first and second rollers are heated to a temperature which is above a melting temperature of the plastomer so as to maintain the plastomer in a molten state with the second roller heated to a temperature which is greater than the temperature of the heated first roller so that the molten layer of plastomer adheres to the surface of the second roller when drawn through the first gap;
  (b) providing a second gap between the heated second roller and an opposed counter-rotating third roller maintained at a temperature between the melting point of the plastomer and the melting point of the polyolefin fibers;
  (c) directing the molten layer of plastomer to the second gap while simultaneously introducing the fabric into the second gap such that one surface of the fabric is positioned against a surface of the third roller and an opposite surface of the fabric is in contact with the molten layer of plastomer;
  (d) drawing the molten layer of plastomer in contact with the fabric through the second gap to thereby apply pressure to the molten layer of plastomer and fabric to cause at least a part of the molten plastomer layer to impregnate the fabric and form a molten plastomer-coated fabric preform; and thereafter
  (e) cooling the plastomer-coated preform to a temperature below 50° C. to obtain the plastomer-coated flexible sheet.

22. The method according to claim 21, wherein step (e) is practiced to cool the plastomer-coated preform to a temperature between 10° C. and 30° C.

23. The method of claim 21, wherein step (c) comprises applying the molten plastomer layer onto the fabric at a plastomer temperature above the melting temperature of the plastomer to a temperature of at most 180° C.

24. The method of claim 23, wherein the molten plastomer layer is deposited at a plastomer temperature between 120° C. and 150° C.

25. The method of claim 21, wherein step (d) includes adjusting the second gap width so that the second and third rollers apply an impregnation pressure of at least 30 bars.

26. The method of claim 21, wherein step (d) is practiced at a temperature between 80° C. and 160° C.

27. The method of claim 21, which further comprises preheating the woven fabric before depositing the molten layer of plastomer thereon.

28. The method of claim 27, wherein the woven fabric is preheated to a temperature between 50° C. and 130° C.

29. The method of claim 21, further comprising a further compression step which comprises heating the plastomer-coated flexible sheet to a heating temperature, and compressing the heated plastomer-coated flexible sheet by application of a compression pressure.

30. The method of claim 29, wherein the plastomer-coated flexible sheet has a thickness after the further compression step which is reduced by at least 2%.

31. The method of claim 21, wherein the plastomer is a semi-crystalline copolymer of ethylene or propylene and one or more C2 to C12 α-olefin co-monomers, and wherein the plastomer has a density of between 880 and 930 kg/m³.

32. The method of claim 21, wherein the plastomer is a thermoplastic copolymer of ethylene or propylene and containing as co-monomers one or more α-olefins having 2-12 C-atoms.

33. The method of claim 21, wherein the amount of the plastomer is chosen to yield a plastomer-coated flexible sheet having an areal density (AD) that is at least 20% higher than the AD of the woven fabric.

34. The method of claim 21, wherein the polyolefin fibers are polyethylene fibers.

35. The method of claim 21, wherein the woven fabric is selected from the group consisting of plain weaves, basket weaves, crow feet weaves, satin weaves and triaxial weaves.

36. The method of claim 21, wherein step (d) is practiced at a calendering temperature between 90° C. and 150° C.

37. The method of claim 34, further comprising a further compression step which comprises heating the plastomer-coated flexible sheet to a heating temperature between a melting temperature of the plastomer and a melting temperature of the polyethylene fibers as determined by DSC, and compressing the heated plastomer-coated flexible sheet by application of a compression pressure.

38. The method of claim 37, wherein the heating temperature of the further compression step is between 60 and 150° C.

39. The method of claim 34, wherein the polyethylene fibers are high molecular weight polyethylene (HMWPE) fibers having a weight average molecular weight between 20,000 and 600,000 g/mol.

40. The method of claim 39, wherein the polyethylene fibers are ultrahigh molecular weight polyethylene (UHMWPE) fibers.

41. The method claim 39, wherein the HMWPE fibers have a weight average molecular weight between 60,000 and 200,000 g/mol.

* * * * *